(No Model.)

W. M. BROWN.
JOINT FOR AND METHOD OF JOINING METAL BARS.

No. 526,434. Patented Sept. 25, 1894.

WITNESSES:
H. E. Ford
E. M. Bolsinger

INVENTOR
William Milton Brown
BY
Ward Raymond
ATTORNEY.

United States Patent Office.

WILLIAM MILTON BROWN, OF JOHNSTOWN, PENNSYLVANIA, ASSIGNOR TO THE JOHNSON COMPANY, OF SAME PLACE.

JOINT FOR AND METHOD OF JOINING METAL BARS.

SPECIFICATION forming part of Letters Patent No. 526,434, dated September 25, 1894.

Application filed March 23, 1894. Serial No. 504,898. (No model.)

*To all whom it may concern:*

Be it known that I, WILLIAM MILTON BROWN, a citizen of the United States, residing at Johnstown, county of Cambria, State of Pennsylvania, have invented a new and useful Improvement in Joints for and Methods of Joining Rails and other Metal Bars, of which the following specification is a true and exact description, due reference being had to the accompanying drawings.

My invention relates specially to welding together metal bars the ends of which cannot readily be moved longitudinally for the purpose of being united or upset into each other during welding.

The object of my invention is to provide a method of effecting this class of weld.

I will describe my method as applied to welding two railroad rails together; but it will be evident that it is equally applicable to welding other kinds of bars, and I will use electricity as a means of heating; but other methods may be employed.

Figure 3:
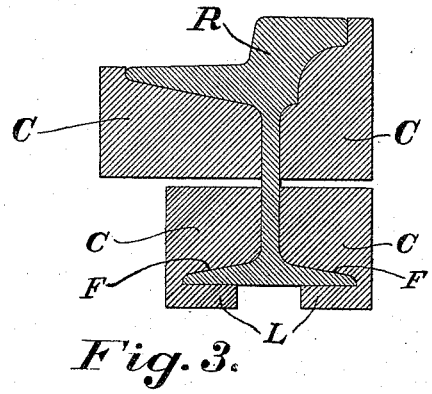
Figure 2:
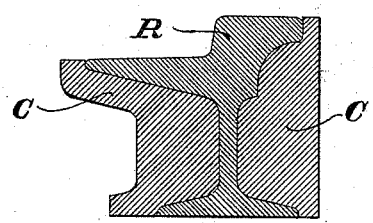
Figure 1:
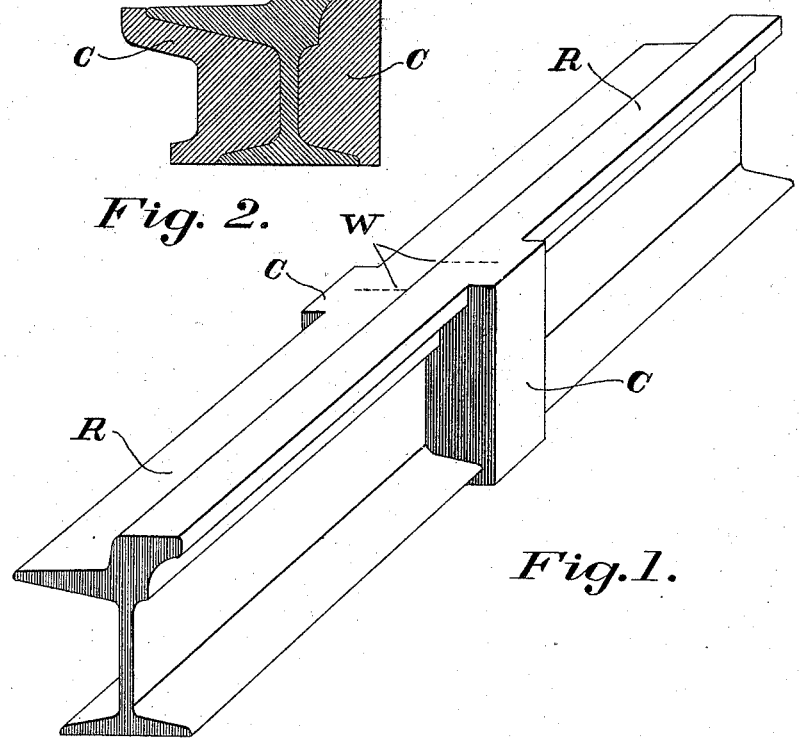

Referring to the drawings: Figure 1 shows two railroad rails welded together by the method herein described. Fig. 2 shows a transverse section through the point of welding. Fig. 3 shows a transverse section through a joint about to be welded in a manner hereinafter described.

In general my method consists in fitting against the rails at the point to be welded, a metal chock or chocks and after heating the chocks and rail to a welding heat, I squeeze the chocks together whereby I unite the whole into one integral mass.

In the drawings, R, R are two railroad rails which have been welded together at the point W.

C, C are the chocks used to effect the weld.

In effecting a weld by this method I proceed as follows: The two rails R, R being placed in position with the ends abutting, or as nearly so as may be, I place the chocks one on each side of the rails and equally overlapping each rail. The two electrodes or contacts of an electric welding machine are then applied to the chocks and a current of electricity sufficiently powerful to heat the rails and chocks is passed through them. When the whole has been raised to a welding heat the chocks are pressed together and this excess of metal being forced into the joint causes the whole to unite into one integral mass. Thus I am enabled to weld the ends of the rails together without moving either rail. This is specially adapted to welding railroad track which has been already laid with splice-bar joints, as by it I am enabled to weld the rails together and unite the whole line into one continuous rail without disturbing the track or road bed, save a small space at each joint. In the case of old track which has been laid with a space between the rails for expansion, it is preferable to insert a thin section of rail, filling as nearly as possible the space before welding.

In Figs. 1 and 2 the chocks on each side are shown in one piece, which is the usual method when the rail is not too high to effect the weld in one operation, but in the case of a higher rail each chock may be divided into two or more pieces, as in Fig. 3.

When the chock is divided as in Fig. 3 it should have a lip underlapping the base flange as shown at L. This prevents the chock from rising as it is pushed in, and insures a good pressure during welding upon the inclined top surface F of the base flange. This bottom chock being welded first, upsets a little and fills the space shown in Fig. 3 between the upper and lower chocks. The upper chock being now applied is prevented from moving downward as it is pushed in, the lower chock performing the same function for it that the lip L performed for the lower chock. Thus a good contact against the under side of the head and tram is assured. The upper chocks extending to the top of the head and tram, respectively, cause these two corners to weld and thus prevent any crack remaining on these edges.

An advantage of this method of welding is that the whole end of the rail is raised to the same heat, and as it all cools together the steel of the rail is relieved of any local strains, which are apt to be present when the heat is unevenly distributed in the articles to be welded, and when the weld is confined to one portion of the rail.

Having thus described my invention, what I claim, and desire to protect by Letters Patent, is—

1. The hereinbefore described method of joining metal bars, which consists in inclosing the articles to be joined at the joint with material adapted to weld to the articles being welded, heating the articles and said material at the joint to a welding heat and applying pressure to the material inclosing the joint whereby the whole is integrally united together without longitudinal motion of the articles.

2. The hereinbefore described method of joining metal bars, which consists in inclosing the articles to be joined at the joint with material adapted to weld to the articles; heating the articles and the material inclosing the joint, by heating through said last-mentioned material, and applying pressure to said material whereby the whole is integrally united together.

3. In combination with two metal bars having their abutting ends integrally united together, metal pieces overlapping the sides of the joint and integrally united to both bars as described.

4. In combination with two abutting railroad rails integrally united together, pieces of metal integrally united thereto at the sides of the joint, said pieces being united to the web and flange members of both rails.

5. In combination with two abutting railroad rails integrally united together, pieces of metal integrally united at the sides of the joint to the web, flange and head portion thereof.

6. In combination with two abutting railroad rails integrally united together, pieces of metal integrally united to both rails at the sides of the joint, some of said pieces having members underlapping the base flanges and others of the pieces having members welded to the edges of tram and head.

7. A welding chock adapted to engage the web and flange members of the rail and weld thereto.

8. A welding chock adapted to engage the web and extremities of flange and head of the rail and weld thereto.

9. A welding chock adapted to engage the web and base flange of the rail and weld thereto, and having a portion adapted to underlap said flange for the purpose set forth.

In testimony whereof I have affixed my signature in presence of two witnesses.

WILLIAM MILTON BROWN.

Witnesses:
S. G. BONN,
H. W. SMITH.